United States Patent
Rousseau

[11] Patent Number: 6,029,919
[45] Date of Patent: Feb. 29, 2000

[54] CATTLE FEED MIXER WITH HAY CHOPPER

[76] Inventor: Victor Rousseau, 700 Route 259, Ste-Monique, Quebec, Canada, J0G 1N0

[21] Appl. No.: 09/206,937

[22] Filed: Dec. 8, 1998

Related U.S. Application Data

[60] Provisional application No. 60/066,764, Nov. 24, 1997.

[51] Int. Cl.$^7$ .................................................. B02C 18/06
[52] U.S. Cl. .................................... 241/101.2; 241/101.8; 241/186.5; 241/605
[58] Field of Search ........................... 241/101.2, 101.76, 241/101.8, 605, 186.5, 236

[56] References Cited

U.S. PATENT DOCUMENTS

| | | |
|---|---|---|
| 2,807,234 | 9/1957 | Middlen . |
| 2,941,505 | 6/1960 | Middlen . |
| 3,760,770 | 9/1973 | Weaver et al. . |
| 4,298,289 | 11/1981 | Walley ...................................... 366/196 |
| 4,524,916 | 6/1985 | Keyes et al. ........................ 241/101.76 |
| 4,896,970 | 1/1990 | Schuler .................................... 366/296 |
| 5,033,683 | 7/1991 | Taylor .................................. 241/101.2 |
| 5,143,310 | 9/1992 | Neier .................................... 241/101.8 |
| 5,803,375 | 9/1998 | Hartwig ...................................... 241/28 |

FOREIGN PATENT DOCUMENTS

| | | |
|---|---|---|
| 2041088 | 10/1991 | Canada . |
| 2029506 | 5/1992 | Canada . |

*Primary Examiner*—John M. Husar
*Attorney, Agent, or Firm*—François Martineau

[57] ABSTRACT

The cattle feed mixer comprises a self-standing container having a cylindrical inner chamber in which is journaled a coaxial shaft rotatably carrying a number of radially extending paddles. An upper opening mouth allows hay and other cattle feed elements to be poured into the inner chamber, where the paddles are rotated to mix these elements together. Sector portions of a number of circular saw blades project into the inner chamber through slits made in the bottom of its inner wall, and rotate at high velocity to shear the hay carried thereagainst by the paddles. Once the mixing and cutting operations are completed, a discharge door is opened to allow the paddles to scoop the now homogeneous cattle feed out through a discharge opening, to be dispensed in suitable receptacles. The container has a collecting trough located under the slits of the saw blades, which is connected via an upwardly-extending sleeve to the inner chamber. Augers in the trough and in the sleeve allow particulate feed elements which have seeped through the blade slits, to be reintegrated into the inner chamber.

11 Claims, 3 Drawing Sheets

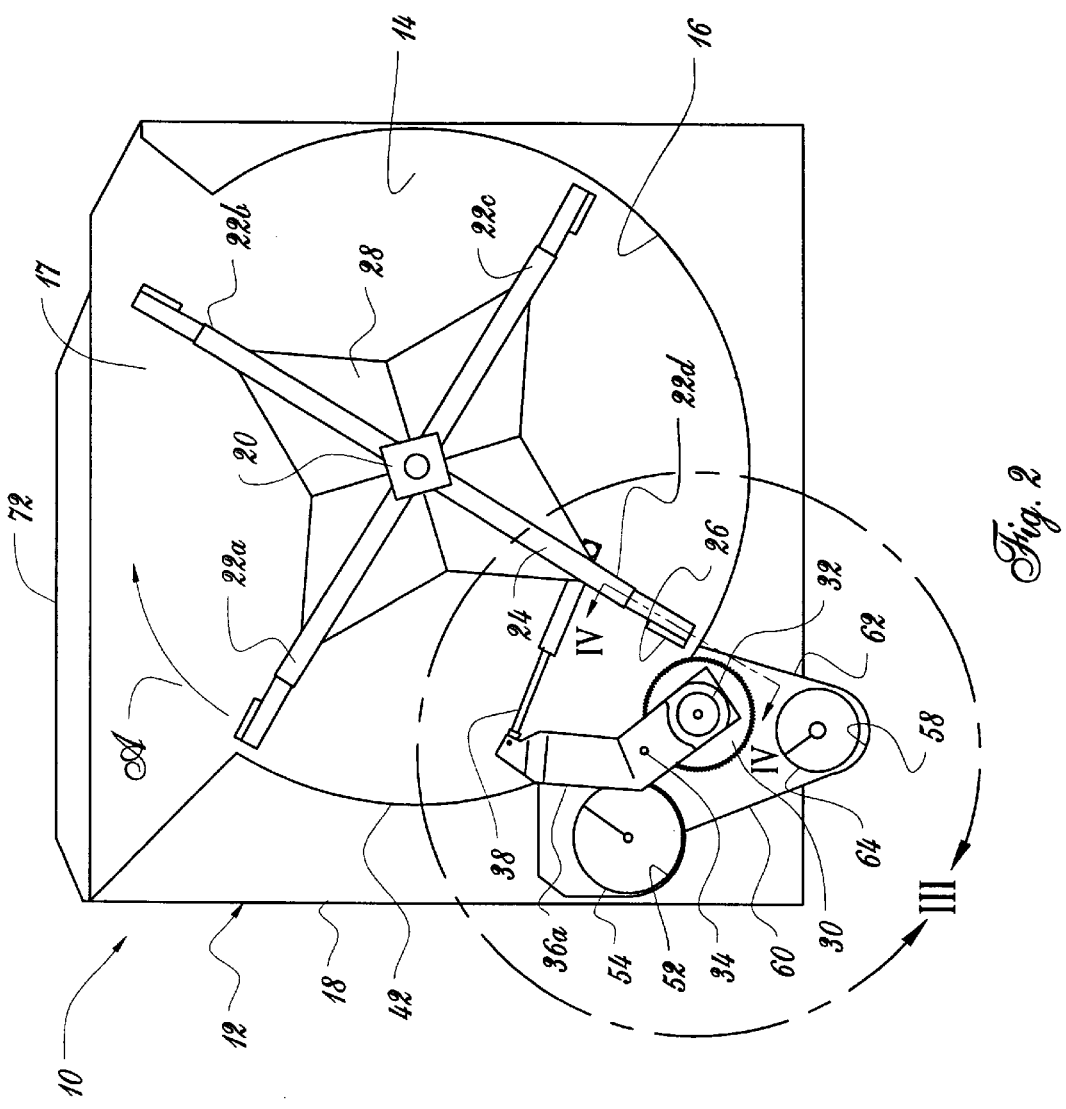

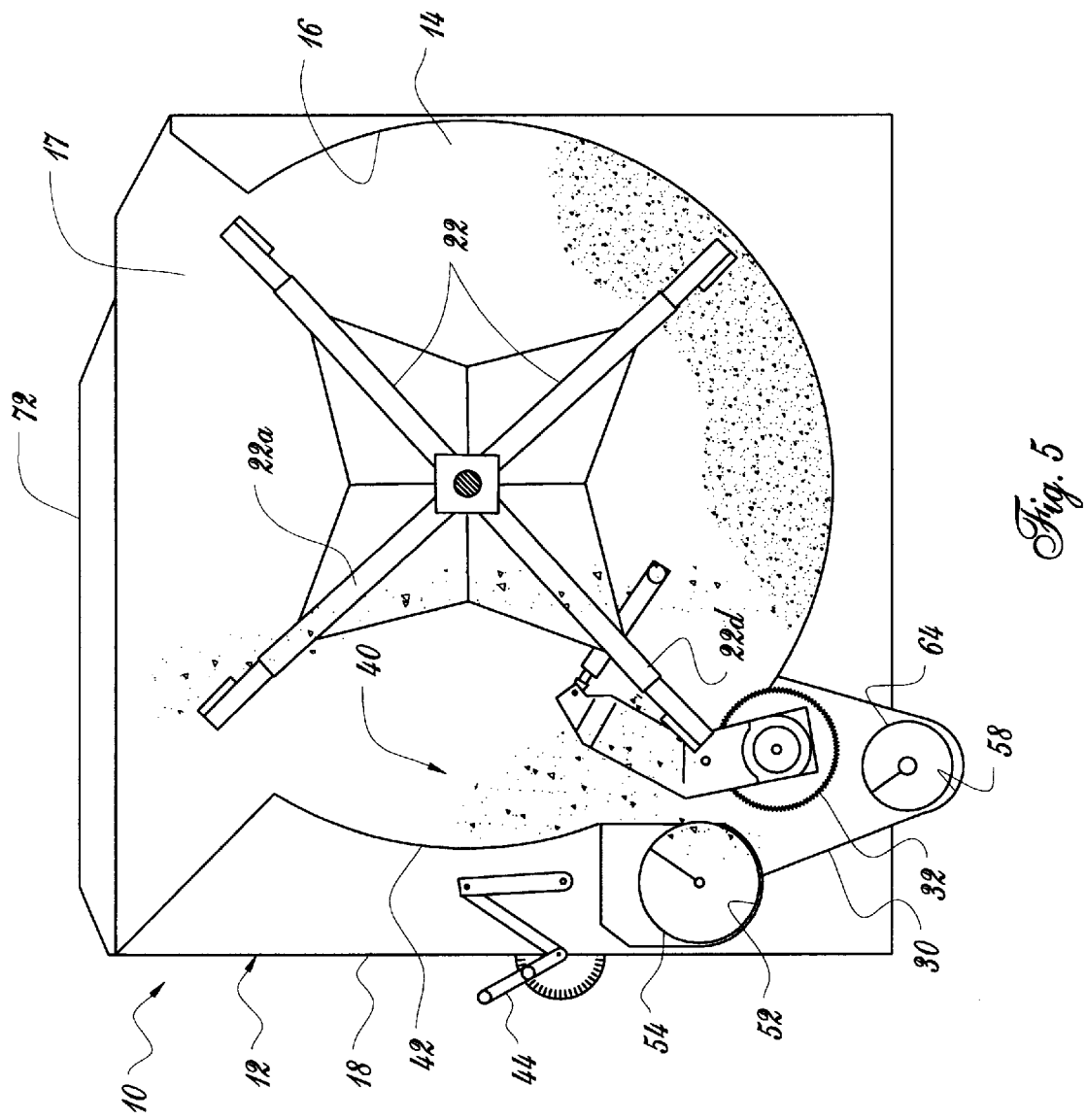

CATTLE FEED MIXER WITH HAY CHOPPER

This appln claims benefit of provisional appn 60/066,764 filed Nov. 24, 1997.

FIELD OF THE INVENTION

The invention relates to cattle feed, and more particularly to a cattle feed mixer.

BACKGROUND OF THE INVENTION

Feed mixers are conventionally used to mix the different ingredients required to constitute suitable mixed rations of food for cattle, cattle meaning in the present specification any herbivorous farm animal. The known feed mixers comprise a container having an inner food-receiving chamber in which hay and other desired edible components are added, such as minerals, vitamins or the like, in selected proportions. The feed elements are then mixed by means of a suitable mixing device such as augers, and are dispensed for the animals as homogeneous cattle feed.

The hay has to be cut or shredded to be of a suitable length, e.g. each straw twig can be cut between 2 inches and 8 inches long, and preferably approximately 5" long. When the hay is not cut manually, machines are used to accomplish this operation, with frequent undesirable side effects such as high dust emmanations from the hay shredding machine into the air which may lead to health hazards over a long period of exposure for the workperson standing near the machine. The dust originates from the dry hay itself, which partially fragments into dust when it is being cut.

A feed mixer is shown in Canadian patent application No. 2,029,506 filed in 1990 by the same present inventor and applicant (hereafter the '506 application). The mixer is included, in the '506 application, in a cattle feeder system which is destined to move along the cattle stalls and automatically dispense the cattle feed according to predetermined, programmed quantities. FIG. 10 of the '506 application shows the feed mixer which comprises an inner chamber having two separate compartments, a first main compartment for the hay and a second compartment for additional selected nutritive elements. The hay in the first compartment is biased by means of a conveyor belt running along the bottom wall, towards a pair of horizontal, superimposed shredders which shred the hay before directing it into a dispensing auger. The selected additional nutritive elements are also discharged into the dispensing auger, where the mixing of the ingredients occurs. Since some hay is allowed to slip under the lowermost shredder, and since the shredders not only shred but also direct the hay towards the dispensing auger, the hay is not always cut into the preferred abovementioned length.

OBJECTS OF THE INVENTION

It is an important object of the present invention to provide a cattle feed mixer apparatus that improves upon the prior art systems by allowing hay to be properly shredded and mixed with other nutritious additives to be dispensed as cattle feed.

SUMMARY OF THE INVENTION

The present invention generally relates to a cattle feed, and more particularly to a cattle feed mixer comprising:

a container resting on the ground and defining an inner chamber having a partially cylindrical lower wall portion which defines a horizontal longitudinal axis, an upper inlet opening and a discharge opening having a door for selectively closing said discharge opening;

a number of paddles carried by said container so as to be rotatable about said longitudinal axis inside said inner chamber and radially extending away from said longitudinal axis and closely adjacent to said lower wall portion, said paddles being operatively rotatable along a single predetermined rotational direction, said paddles thus defining a lower upstroke quadrant in said inner chamber, with said discharge opening being located along said inner chamber lower wall portion and having a lower edge registering with said upstroke quadrant;

a number of spaced-apart cutting members projecting radially inwardly from said cylindrical lower wall portion and aligned parallel to said longitudinal axis and tangentially upstream of said discharge opening, relative to said direction of rotation of said paddles;

radially outward grooves provided on said paddles and registering with said cutting members for allowing passage of said paddles partially around said cutting members without any mutual interference; and a first power device, for power rotating said paddles; wherein cattle feed elements located inside said inner chamber are scooped and mixed together by said rotating paddles while said door closes said discharge opening, and are gradually ejected through said discharge opening as a substantially homogeneous cattle feed by said paddles during their upstroke upon said door being opened, whereby hay and the like feed elements are shredded by said cutting members previously to being ejected through said discharge opening.

Preferably, said container comprises a dispensing trough registering with said discharge opening for receiving therein the cattle feed ejected through said discharge opening, said feed mixer having a dispensing auger rotatably carried in said trough and a second power device for power rotating said dispensing auger, said trough having a dispensing spout towards which the cattle feed is carried by said auger for ejection of the cattle feed through said spout.

Preferably, said container further comprises an outer housing enclosing said chamber inner wall and said dispensing trough, for preventing hay dust emmanations from polluting the exterior environment.

Preferably, said cutting members comprise circular saw blades carried by a rotatable shaft on said container outwardly of said inner chamber but partially radially extending therein through registering slits formed in said cylindrical lower wall portion, said shaft being power rotated by a third power device and being carried so as to rotate around an axis parallel to said longitudinal axis.

Preferably, said circular saw blades rotate in a direction opposite said paddles.

Preferably, said shaft is movable by a fourth power device whereby said circular saw blades are consequently movable between an operative position, in which a sector portion thereof radially projects into said inner chamber through said slits so as to shred the hay when rotated, and an idle position, in which radially extend short of said inner chamber so as to be entirely located exteriorly of said inner chamber.

Preferably, said fourth power device is at least one powered ram and said shaft of said circular saw blades is pivotally mounted on said container, whereby pivotal displacement of said circular saw blades between said operative position and said idle position is accomplished by said powered ram.

Preferably, said container comprises a horizontal collecting trough located outwardly of said inner chamber and under said slits, for receiving therein particulate feed elements that accidentally seep through said slits, said cattle feed mixer further comprising a collecting auger in said collecting trough powered by a fifth power device and an upwardly-inclined elevating auger powered by a sixth power device and located in a complementary sleeve attached to said container, said sleeve being serially connected at its lower end to said collecting trough and having an output spout at its upper end connected to said inner chamber, whereby the particulate feed elements collected in said collecting trough are carried by said collecting auger and by said elevating auger through said collecting trough and said sleeve respectively, and are ejected through said output spout into said inner chamber.

Preferably, said container is self standing.

Preferably, said discharge opening is centrally disposed along said lower wall portion, relative to said longitudinal axis.

Preferably, the cattle feed mixer of the invention comprises four paddles mounted on a single shaft and aligned by pairs of radially extending paddles, with each pair of paddles being perpendicular to the other pair of paddles and being longitudinally spaced relative to the other pair of paddles.

Preferably, said container comprises a cover for selectively closing said upper inlet opening.

DESCRIPTION OF THE DRAWINGS

In the annexed drawings:

FIG. 2 is an enlarged side cross-sectional view of the auger of FIG. 1 with the circular saw blades being in their operative shredding position and with the discharge door being closed;

FIG. 3 shows the area III of FIG. 2, but with the circular saw blades being in their idle position and with the discharge door being opened;

FIG. 4 is a partial cross-sectional view taken along line IV—IV of FIG. 2; and

FIG. 5 is a view similar to FIG. 2, further showing cattle feed being mixed and discharged by the rotatable paddles.

DETAILED DESCRIPTION OF THE EMBODIMENTS

Figure 1:
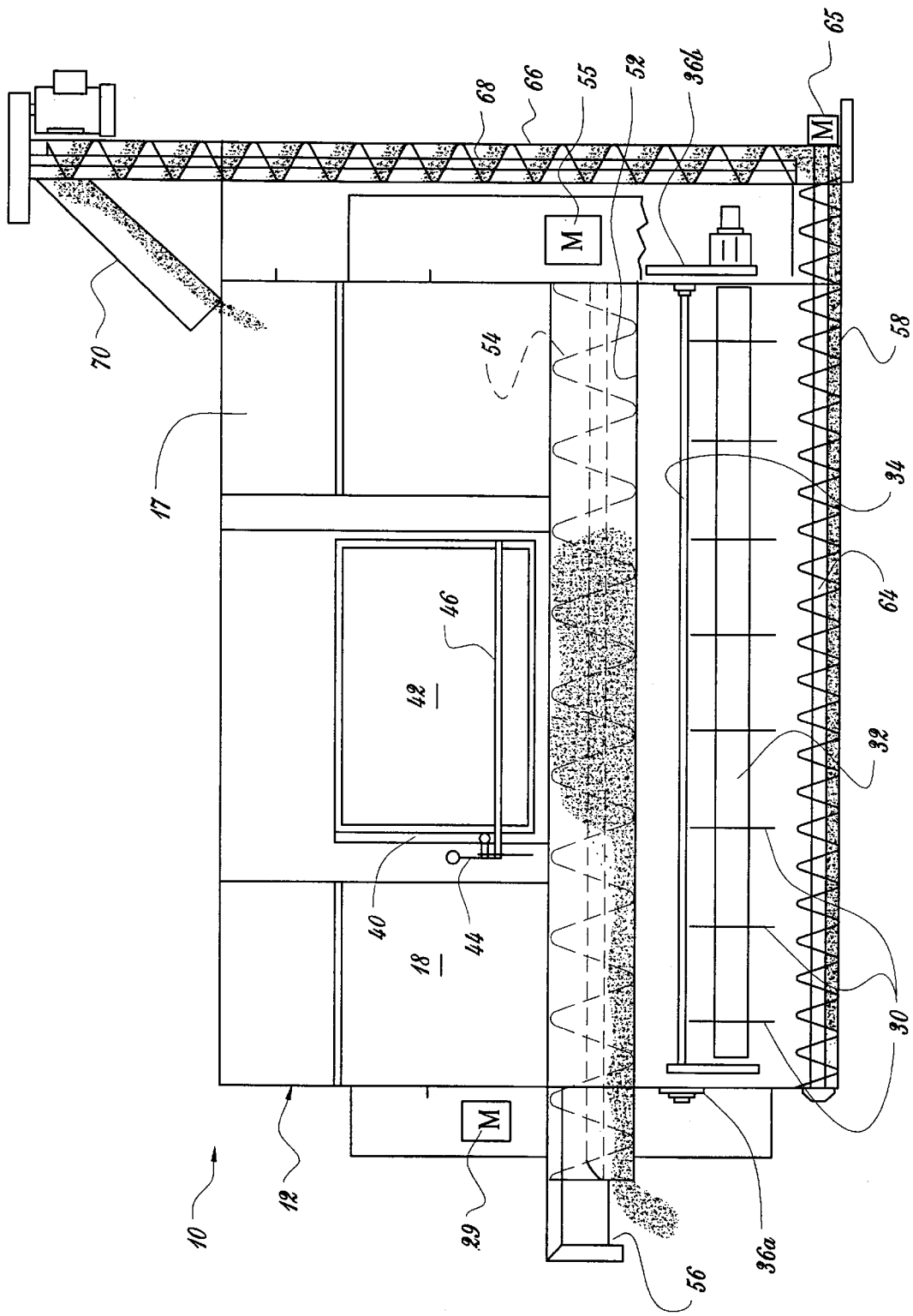
FIG. 1 is a partly broken front elevation of the cattle feed mixer according to the preferred embodiment of the invention, with the lower service door being removed for clarity of the drawing and with the augers being shown through their respective see-through wells, and further showing cattle feed being dispensed through the dispensing auger and collected and carried by the collecting and elevating augers to be reintegrated into the main inner mixing chamber.

FIGS. 1 and 2 show a cattle feed mixer 10 according to the preferred embodiment of the invention, which comprises a main body in the form of a large self-standing container 12 having an inner chamber 14 which defines a cylindrical inner wall 16 and an upper inlet opening 17. Container 12 comprises an outer housing 18 which outwardly covers the different parts of mixer 10; this is especially desirable to prevent health hazard to maintenance crew in view of the different moving parts of mixer 10 and to prevent excessive hay dust from emmanating into the immediate environment. Container 12 rests on the ground with the lower edge portion of housing 18, and is thus self-standing. It is envisioned to provide a supporting wheeled cart beneath container 12, to allow displacement thereof to different locations.

Inside cylindrical inner chamber 14 is coaxially journaled a horizontal shaft 20 which carries a number, e.g. four, radially extending paddles 22a, 22b, 22c, 22d, generally referred to as paddles 22. FIGS. 2 and 3 show that each paddle, e.g. paddle 22d, comprises a radially extending arm 24 to which is radially endwisely attached a transverse plate 26.

Preferably, as suggested in the drawings, arm 24 is telescopic so as to allow length adjustment thereof.

Preferably, paddles 22 are arranged in longitudinally spaced-apart pairs of aligned paddles inside inner chamber 14, i.e. aligned paddles 22a and 22c are located in the first longitudinal half of inner chamber 14, while aligned paddles 22b and 22d are located in the second longitudinal half of inner chamber 14. Paddles 22 are moreover linked by central reinforcement plates 28 which are each attached to the arms 24 of the two angularly adjacent paddles 22 and to shaft 20, reinforcement plates 28 thus obliquely extending inside inner chamber 14 between two laterally spaced perpendicular paddles 22.

A first power device, e.g. an electric motor 29, is operatively connected to one end of shaft 20 to allow selective rotation of shaft 20 and consequently of paddles 22, in a single direction of rotation suggested by arrow A in FIG. 2. For purposes of maintenance, paddles 22 may be allowed to turn in the direction opposite the operative above-mentioned single direction of rotation. Rotation of paddles 22 allows each aligned pair of paddles 22 to sweep a different longitudinal portion of inner chamber 14, with each paddle 22 radially extending adjacent cylindrical wall 16, though spacedly therefrom.

Mixer 10 further comprises a number, e.g. eight, circular saw blades 30 integrally attached to a horizontal shaft 32 journaled beneath and outside of inner chamber 14. As suggested in FIGS. 1, 2 and 3, shaft 32 is carried by and can be pivoted about a lengthwise horizontal rod 34 by means of a pair of elbowed levers 36a, 36b mounted at opposite ends of shaft 32 and controlled by a pair of respective powered hydraulic rams 38 (only one ram 38 is shown in FIGS. 2 and 3). This pivotal displacement of shaft 32 can be accomplished between an operative position shown in FIG. 2, in which a sector shape portion of each saw blade 30 radially projects through wall 16 and into inner chamber 14, through complementary slits in wall 16; and an idle position shown in FIG. 3, in which saw blades 30 become retracted to radially extend short of wall 16 and are thus located entirely outside of inner chamber 14.

Alternately, a single ram 38 could be used to pivot saw blades 30.

Inner chamber 14 further comprises a discharge opening 40 (FIG. 3) selectively closable by a discharge door 42, the discharge opening 40 being shown with door 42 being closed in FIG. 2 and being opened in FIG. 3. FIGS. 1 and 5 show that door 42 may be selectively opened or closed with a manually operable linkage and lever assembly 44, thus lever pivotally mounted on a horizontal rod 46 and attached to door 42.

Opening 40 is located along wall 16 so as to correspond to the upstroke of rotating paddles 22. Since paddles 22 operatively rotate in the clockwise direction in FIG. 2 shown by arrow A, the upstroke of a rotating paddle 22 corresponds to its rotative movement in the lower and upper left quadrants in FIG. 2. The lower edge 40a (FIG. 3) of opening 40 is the first edge encountered by an upwardly rotating paddle 22, and is positioned in the lower left quadrant in FIG. 2, which can be generally defined for the purpose of the present specification as the lower upstroke quadrant. As long as discharge opening 40 has a suitably large dimension to allow discharge of cattle feed therethrough as will be explained hereinafter, it can extend up to inlet opening 17 as shown in FIG. 2, or alternately it could be much shorter—it is envisioned that the discharge opening 40 be located entirely in the lower upstroke quadrant of wall 16. In any event, the discharge opening lower edge 40a is preferably located in the lower upstroke quadrant for efficient cattle feed discharge therethrough, in a manner described hereinafter, while simultaneous cutting of the hay can be accomplished with the circular saw blades 30 upstream of opening 40 along wall 16, relative to the direction of rotation of paddles 22.

As shown in FIG. 1, discharge opening 40 and discharge door 42 are preferably longitudinally centered along container 12, so as to come in register with the center of gravity thereof and thus to promote structural stability of feed mixer 10 during use. Preferably, discharge opening 40 extends through most of the length of inner wall 14, to prevent cattle feed accumulation on either side of opening 40 inside inner chamber 14.

FIG. 4 shows that when the sector shape portions of saw blades 30 project through wall 16 and into inner chamber 14 in their operative position, paddles 22 are still allowed their rotative displacement, although they rotate adjacent cylindrical wall 16, without mutual interference with saw blades 30. This is due to registering grooves 48, 50 provided in the lower portion of the plates 26 of paddles 22 in which saw blades 30 loosely fit to allow contactless rotative free passage of paddles 22 partially around projecting the sector portion edges of saw blades 30.

FIGS. 1, 2 and 3 shows that a dispensing trough 52 is located outwardly of inner chamber 14, extending horizontally adjacent and under discharge opening 40 and lengthwisely extending on either side thereof. A dispensing auger 54 is power rotated by power device 55 in dispensing trough 52 to carry cattle feed discharged therein towards a suitable downstream dispensing spout 56 which is thus located at the dispensing trough downstream end. FIG. 1 shows that dispensing trough 52 and auger 54 extend at their upstream ends beyond discharge opening 40, but it is understood that their upstream end could register with the upstream side edge of discharge opening 40. Dispensing trough 52 is located inside housing 18, and consequently dust emmanations are prevented from escaping to the exterior environment, except possibly through spout 56.

A horizontally extending collecting trough 58 is located beneath saw blades 30, with its lateral walls 60, 62 extending upwardly to the underside of wall 16 so as to define a funnel shape closed casing. Wall 60 can alternately include a service door, for allowing access into collecting trough 58 for maintenance purposes, FIG. 1 suggesting the outside appearance of trough 58 with the service door removed. A collecting auger 64 is power rotated inside trough 58 by power device 65. As shown in FIG. 1, trough 58 and collecting auger 64 are serially connected to an upwardly inclined sleeve 66 housing an elevating auger 68. The upper end of sleeve 66 has an output spout 70 which is oriented into the inner chamber inlet opening 17. Any feed elements collected in collecting trough 58 are carried by auger 64 towards sleeve 66 which is thus at its downstream end, and then carried by elevating auger 68 to spout 70 which is thus at the elevating auger 68 and sleeve 66 downstream end, to be reintegrated into inner chamber 14 Both augers 64 and 68 may be powered in rotation by the same power device 65, e.g. an electric motor.

A selectively removable cover 72 is preferably installed over inlet opening 17 to help prevent accidental dust emmanations escape from chamber 14 into the environment.

In use, hay and other feed elements are poured into inner chamber 14 through inlet opening 17, cover 72 being removed or pivoted to allow this operation. Discharge door 42 remains closed to block the access out of inner chamber through discharge opening 40. Paddles 22 are then rotated along arrow A at a relatively slow pace while saw blades 30 are power rotated at high velocity and are pivoted into their operative position in which their blade sector shape portion project through wall 16 and inside inner chamber 14. The hay is thus gradually pushed against blades 30 by paddles 22 to cut the hay into smaller twigs which are more readily chewable by the cattle, while simultaneous mixing of the different feed elements occurs due to the rotating paddles 22 which successively scoop the feed elements as suggested by paddle 22a in FIG. 5. Once the mixing and cutting operations have been executed for a suitably long time, a substantially homogeneous cattle feed is obtained.

Saw blades 30 are then pivoted into their idle position in which they are located entirely out of inner chamber 14, and discharge door 42 is opened, as suggested in FIG. 5. Paddles 22 continue to mix the feed elements while they gradually discharge the cattle feed out through discharge opening 40 during their upstroke, as suggested by paddle 22d in FIG. 5.

Since the preferably rectangular end plates 26 carried at the radially outward end of paddles 22 have a small raidal size (FIG. 4), only the bottom layer of the entire cattle feed will be scooped by a single paddle while the upper layers will afterwards shift due to the scooping action to eventually reach the lower layer. Indeed, each paddle 22 will scoop a relatively small quantity of cattle feed compared to the quantity present in inner chamber 14, as suggested in FIG. 5, to allow gradual mixing and discharge of the cattle feed.

The cattle feed ejected through discharge opening 40 falls into the intermediate section of the elongated dispensing auger 54 to the dispensing spout 56 to be ejected and collected by a suitable container (not shown).

All along the mixing and dispensing operations, dust that results from the cutting operation will be present in inner chamber 14. The closed configuration of inner chamber 14 helps prevent the dust from escaping to the outer environment. Indeed, inner chamber 14, when cover 72 is closed, forms a substantially airtight enclosure.

Some particulate feed elements, including hay dust and other granular feed elements, will accidentally seep through the slits in wall 16 through which saw blades 30 are allowed passage into inner chamber 14. The particulate feed elements that seep through the slits of wall 16 fall into collecting trough 58 and are carried by collecting auger 64 to elevating upright auger 68 in sleeve 66, to be upwardly carried and reintegrated into inner chamber 14 through inclined spout 70.

Thus, little or no loss of the nutritious feed elements occurs, while dust emmanations are minimized.

It is alternately possible to finish the cutting operation while discharge door 42 is opened. Indeed, while it is desirable to allow the mixing and cutting operations to be executed during a certain time with discharge door 42 closed to allow a suitable homogeneous cattle feed to be produced, it would be possible to continue the cutting operation, i.e. with saw blades 30 in their operative position with their edges projecting inside inner chamber 14, while discharge door 42 is opened to allow simultaneous discharge of the cattle feed. A scooped quantity of feed elements will be pushed by a paddle 22 first against saw blades 30 and afterwards out through discharge opening 40, which helps to provide properly shredded cattle feed while the discharging operation occurs.

Circular saw blades 30 preferably rotate in a direction opposite that of paddles 22, so as to promote efficient cutting of the hay inside inner chamber 14.

Any modifications to the present invention, which do not deviate from the general scope thereof, are considered to be included therein.

For example, it could be envisioned that the inner chamber wall 16 of container 12 have a different shape at its upper quadrants in FIG. 2. Indeed, as long as the lower portion of the wall 16 has a cylindrical shape and that wall 16 does not hinder the rotative movement of paddles 22, an operational cattle feed mixer would be provided. Thus, the upper portions of wall 16 could be vertical instead of inwardly curved, although this is not the preferred mode to carry out the invention.

Also, it could be envisioned to replace the circular saw blades by alternate cutting members, such as very sharp knives. The paddles' rotative movement could then be done at a quicker pace, to bias the hay against the knives at higher speed to promote the cutting of the hay.

It could further be envisioned that the rotative circular saw blades or the cutting members be stationary instead of pivotably mounted on the container with a pivotable shaft, the saw blades or cutting members then having a single operative position inside inner chamber 14.

The shape of the inner chamber wall 16 could be slightly conical towards both of its extremities, so that the cattle feed slide gradually towards the center of inner chamber 14. Of course, paddles 22 would then be consequently inclined to correspond to the shape of wall 16, so as to rotatably sweep adjacent thereto.

I claim:

1. A cattle feed mixer comprising:
    a container resting on the ground and defining an inner chamber having a partially cylindrical lower wall portion which defines a horizontal longitudinal axis, an upper inlet opening and a discharge opening having a door for selectively closing said discharge opening;
    a number of paddles carried by said container so as to be rotatable about said longitudinal axis inside said inner chamber and radially extending away from said longitudinal axis and closely adjacent to said lower wall portion, said paddles being operatively rotatable along a single predetermined rotational direction, said paddles thus defining a lower upstroke quadrant in said inner chamber, with said discharge opening being located along said inner chamber lower wall portion and having a lower edge registering with said upstroke quadrant;
    a number of spaced-apart cutting members projecting radially inwardly from said cylindrical lower wall portion and aligned parallel to said longitudinal axis and tangentially upstream of said discharge opening, relative to said direction of rotation of said paddles;
    radially outward grooves provided on said paddles and registering with said cutting members for allowing passage of said paddles partially around said cutting members without any mutual interference; and
    a first power device, for power rotating said paddles;
    wherein cattle feed elements located inside said inner chamber are scooped and mixed together by said rotating paddles while said door closes said discharge opening, and are gradually ejected through said discharge opening as a substantially homogeneous cattle feed by said paddles during their upstroke upon said door being opened, whereby hay and the like feed elements are shredded by said cutting members previously to being ejected through said discharge opening;
    wherein said cutting members comprise circular saw blades carried by a rotatable shaft on said container outwardly of said inner chamber but partially radially extending therein through registering slits formed in said cylindrical lower wall portion said shaft being power rotated by a third power device and being carried so as to rotate around an axis parallel to said longitudinal axis.

2. A cattle feed mixer as defined in claim 1, wherein said container comprises a dispensing trough registering with said discharge opening for receiving therein the cattle feed ejected through said discharge opening, said feed mixer having a dispensing auger rotatably carried in said trough and a second power device for power rotating said dispensing auger, said trough having a dispensing spout towards which the cattle feed is carried by said auger for ejection of the cattle feed through said spout.

3. A cattle feed mixer as defined in claim 2, wherein said container further comprises an outer housing enclosing said chamber inner wall and said dispensing trough, for preventing hay dust emmanations from polluting the exterior environment.

4. A cattle feed mixer as defined in claim 1, wherein said circular saw blades rotate in a direction opposite said paddles.

5. A cattle feed mixer as defined in claim 1, wherein said shaft is movable by a fourth power device whereby said circular saw blades are consequently movable between an operative position, in which they radially project into said inner chamber through said slits so as to shred the hay when rotated, and an idle position, in which they radially extend short of said inner chamber so as to be entirely located exteriorly of said inner chamber.

6. A cattle feed mixer as defined in claim 5, wherein said fourth power device is at least one powered ram and said shaft of said circular saw blades is pivotally mounted on said container, whereby pivotal displacement of said circular saw blades between said operative position and said idle position is accomplished by said powered ram.

7. A cattle feed mixer as defined in claim 1, wherein said container comprises a horizontal collecting trough located outwardly of said inner chamber and under said slits, for receiving therein particulate feed elements that seep through said slits, said cattle feed mixer further comprising a collecting auger in said collecting trough powered by a fifth power device and an upwardly-inclined elevating auger powered by a sixth power device and located in a complementary sleeve attached to said container, said sleeve being serially connected at its lower end to said collecting trough and having an output spout at its upper end connected to said inner chamber, whereby the particulate feed elements collected in said collecting trough are carried by said collecting auger and by said elevating auger through said collecting trough and said sleeve respectively, and are ejected through said output spout into said inner chamber.

8. A cattle feed mixer as defined in claim 1, wherein said container is self standing.

9. A cattle feed mixer as defined in claim 1, wherein said discharge opening is centrally disposed along said lower wall portion, relative to said longitudinal axis.

10. A cattle feed mixer as defined in claim 1, comprising four paddles mounted on a single shaft and aligned by pairs of radially extending paddles, with each pair of paddles being perpendicular to the other pair of paddles and being longitudinally spaced relative to the other pair of paddles.

11. A cattle feed mixer as defined in claim 1, wherein said container comprises a cover for selectively closing said upper inlet opening.

* * * * *